(12) United States Patent
Kwon et al.

(10) Patent No.: US 9,990,153 B2
(45) Date of Patent: Jun. 5, 2018

(54) MEMORY SYSTEM AND WEAR-LEVELING METHOD THEREOF

(71) Applicant: SK hynix Inc., Gyeonggi-do (KR)

(72) Inventors: Jung-Hyun Kwon, Seoul (KR); Dong-Gun Kim, Gyeonggi-do (KR); Sang-Gu Jo, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days. days.

(21) Appl. No.: 15/618,597

(22) Filed: Jun. 9, 2017

(65) Prior Publication Data

US 2018/0113636 A1 Apr. 26, 2018

(30) Foreign Application Priority Data

Oct. 24, 2016 (KR) .......................... 10-2016-0138356

(51) Int. Cl.
*G06F 12/02* (2006.01)
*G06F 3/06* (2006.01)

(52) U.S. Cl.
CPC ............ *G06F 3/0619* (2013.01); *G06F 3/065* (2013.01); *G06F 3/0688* (2013.01); *G06F 12/0246* (2013.01); *G06F 2212/7201* (2013.01); *G06F 2212/7211* (2013.01)

(58) Field of Classification Search
CPC ..... G06F 2212/7201; G06F 2212/7211; G06F 3/0619; G06F 3/065; G06F 3/0688; G06F 12/0246

USPC ..................................................... 365/185.09
See application file for complete search history.

(56) References Cited

U.S. PATENT DOCUMENTS

| 8,108,592 | B2 | 1/2012 | Kim et al. | |
|---|---|---|---|---|
| 8,154,939 | B2 | 4/2012 | Mochizuki et al. | |
| 2009/0248962 | A1* | 10/2009 | Kim ................... | G06F 12/0246 711/103 |
| 2010/0293350 | A1* | 11/2010 | Happ ..................... | G11C 11/16 711/162 |
| 2014/0204663 | A1* | 7/2014 | Faber ................. | G11C 13/0004 365/163 |

* cited by examiner

*Primary Examiner* — Han Yang
*Assistant Examiner* — Xiaochun L Chen
(74) *Attorney, Agent, or Firm* — IP & T Group LLP

(57) ABSTRACT

A memory system includes a memory device performing write operations on lines included in a memory block among a plurality of memory blocks included in the memory device; a counting unit counting a write count for each of the plurality of memory blocks, and outputting the write counts; a first wear-leveling unit performing a wear leveling operation by shifting the lines of each of the plurality of memory blocks; and a second wear-leveling unit detecting hot and cold memory blocks among the plurality of memory blocks based on the write counts, and swapping the hot memory block with the cold memory block, wherein the second wear-leveling unit selects at least one memory block among the plurality of memory blocks based on the write counts, and checks whether the write operation is performed on each of the lines included in the selected memory block.

20 Claims, 5 Drawing Sheets

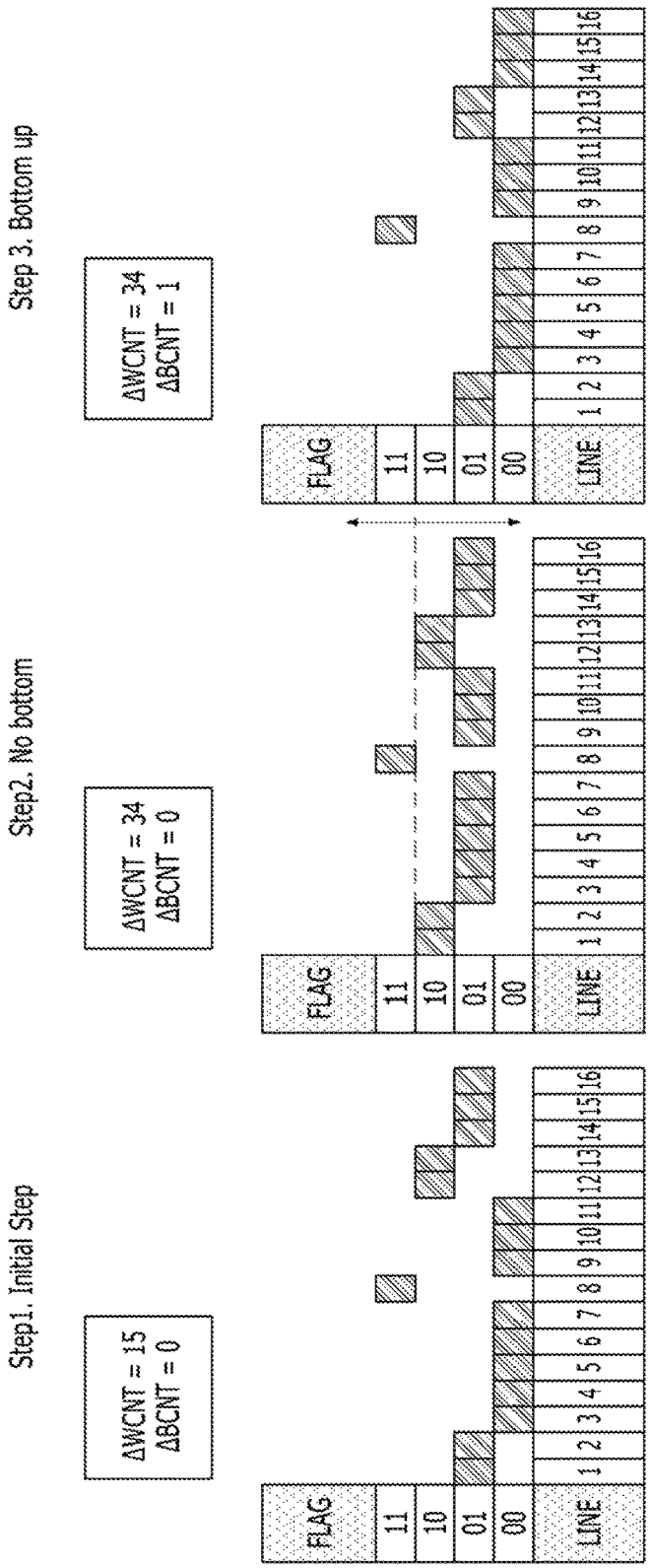

MEMORY SYSTEM AND WEAR-LEVELING METHOD THEREOF

CROSS-REFERENCE TO RELATED APPLICATION

This application claims priority under 35 U.S.C. § 119 to Korean Patent Application No. 10-2016-0138356 filed on Oct. 24, 2016 in the Korean Intellectual Property Office, the disclosure of which is incorporated herein by reference in its entirety.

TECHNICAL FIELD

Exemplary embodiments relate to a memory system, and more particularly, to a memory system that performs wear-leveling for a nonvolatile memory device, and an operating method of the same.

DISCUSSION OF THE RELATED ART

Semiconductor memory devices are generally classified into volatile and nonvolatile memory devices.

A volatile memory device has high write and read speed, but loses data stored therein when power supply is cut off. Examples of a volatile memory device include a dynamic random access memory (DRAM), a static RAM (SRAM), and the like. A nonvolatile memory device has comparatively low write and read speed, but retains data stored therein even when power is cut off. Therefore, typically, a nonvolatile memory device is used when there is the need for storing data which should be retained regardless of the status of power supply. Representative examples of non-volatile memory devices include a read only memory (ROM), a mask ROM (MROM), a programmable ROM (PROM), an erasable programmable ROM (EPROM), an electrically erasable programmable ROM (EEPROM), a flash memory, a phase change RAM (PCRAM), a magnetic RAM (MRAM), a resistive RAM (RRAM), a ferroelectric RAM (FRAM), and the like.

Nonvolatile memory devices such as the RRAM, and the PCRAM have limited write endurance. The write endurance may be defined as the number of program/write cycles that are allowed for a memory block before a storage media loses its reliability. The write endurance may be calculated by estimating how often and how evenly the memory is used.

Therefore, when write operations are focused on a certain cell, the lifespan of the memory device may be rapidly reduced. Typically, to address the foregoing concern, a wear-leveling operation is performed so that write operations are more uniformly performed on the cell regions of a memory device. The wear-leveling operation is a technique used to improve the write endurance of the storage media. In this technique, when data are written in the storage media, distributed write operations are performed on respective memory cells. Accordingly, repetitive use of a certain memory cell of the storage media may be reduced, and memory cells may be more uniformly used. Typically, the wear-leveling operation is performed by a memory controller. For example, the memory controller controls the memory cells so that, when a write request for the storage media is received from a host, a write operation is performed mainly on memory cells that have been less used among empty memory cells, by performing an appropriate mapping operation between logical addresses and physical addresses taking into account the number of overwrite operations.

SUMMARY

Various embodiments are directed to a memory system capable of checking repetitive write operations on memory regions, and classifying the memory regions such that write operations are uniformly performed on the memory regions, and an operating method thereof.

In accordance with an embodiment of the present invention, a memory system includes: a memory device configured to perform write operations on one or more lines included in a memory block among a plurality of memory blocks included in the memory device; a counting unit configured to count a write count for each of the plurality of memory blocks, and output the write counts; a first wear-leveling unit configured to perform a wear leveling operation by shifting the one or more lines of each of the plurality of memory blocks; and a second wear-leveling unit configured to detect hot and cold memory blocks among the plurality of memory blocks based on the write counts, and swap the hot memory block with the cold memory block, wherein the second wear-leveling unit selects at least one memory block among the plurality of memory blocks based on the write counts, and checks whether the write operation is performed on each of the one or more lines included in the selected memory block.

In accordance with an embodiment of the present invention, an operating method of a memory system includes: counting the number of write operations for a plurality of memory blocks of a memory device, and output write counts; performing a first wear-leveling operation by shifting a plurality of lines included in each of the plurality of memory blocks; performing a second wear-leveling operation by detecting hot and cold memory blocks among the plurality of memory blocks based on the write counts, and swapping the hot memory block with the cold memory block; selecting at least one of the plurality of memory blocks based on the write counts, and detecting a hot line by checking whether the write operation is performed on each of the plurality of lines included in the selected memory block.

In accordance with an embodiment of the present invention, an operating method of a memory system includes: counting the number of write operations for a plurality of memory blocks of a variable resistance memory device, and output the write counts; performing a first wear-leveling operation by shifting a plurality of lines included in each of the plurality of memory blocks; performing a second wear-leveling operation by detecting hot and cold memory blocks among the plurality of memory blocks based on the write counts, and swapping the hot memory block with the cold memory blocks; selecting at least one of the plurality of memory blocks based on the write counts, and grouping the plurality of lines included in the selected memory block into a top group, a middle group and a bottom group depending on the number of write operations performed on the plurality of lines; and detecting, on a regular cycle, a line of the top group as a hot line depending on the number of the grouped lines and the number of the write operations performed on the bottom group, when the write count of the selected memory block is greater than or equal to a first reference value.

BRIEF DESCRIPTION OF THE DRAWINGS

The above and other features and advantages of the present invention will become more apparent to those skilled in the art to which the present invention pertains by the following detailed description with reference to the attached drawings in which:

FIGS. 4A and 4B are diagrams illustrating an exemplary operation of regrouping a plurality of lines for the wear-leveling operation of FIG. 3.

DETAILED DESCRIPTION

Figure 1:
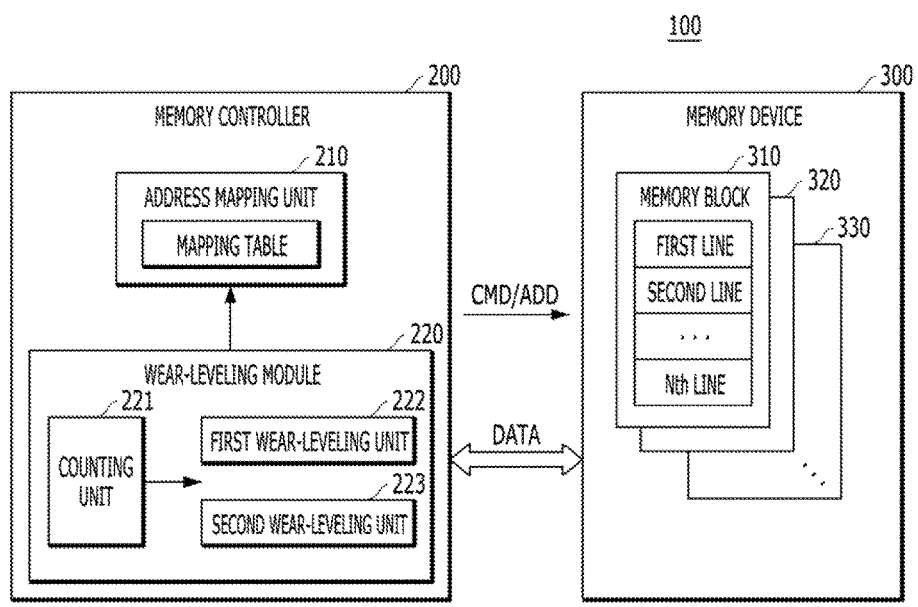
FIG. 1 is a block diagram illustrating a memory system in accordance with an embodiment of the present invention.

Various embodiments will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

It is noted that the drawings are simplified schematics and as such are not necessarily drawn to scale. In some instances, various parts of the drawings may have been exaggerated in order to more clearly illustrate certain features of the illustrated embodiments.

It is further noted that in the following description, specific details are set forth for facilitating the understanding of the present invention, however, the present invention may be practiced without some of these specific details. Also, it is noted, that well-known structures and/or processes may have only been described briefly or not described at all to avoid obscuring the present disclosure with unnecessary well known details.

It is also noted, that in some instances, as would be apparent to those skilled in the relevant art, an element (also referred to as a feature) described in connection with one embodiment may be used singly or in combination with other elements of another embodiment, unless specifically indicated otherwise.

FIG. 1 is a block diagram illustrating a memory system 100 in accordance with an embodiment of present invention.

Referring to FIG. 1, the memory system 100 may include a memory controller 200 and a memory device 300. The memory controller 200 may generate a command CMD and an address ADD in response to a request from a host (not shown), and store data DATA in the memory device 300 or read data DATA from the memory device 300.

The memory device 300 shown in FIG. 1 may be or include a PCRAM. However, the present disclosure is not limited to this. In other embodiments, the memory device 300 may be or include a variable resistance memory device such as an MRAM, a RRAM, and an FRAM. A variable resistance memory device may divide data stored therein by the resistance of a memory cell. Furthermore, a variable resistance memory device may support an overwrite operation without performing an erase operation before writing data in the memory device. That is, by a write operation, data '0' that has been stored in a memory cell may be changed to data '1', or data '1' may be changed to data '0'. Therefore, the memory device 300 may be worn on a basis of a unit on which a write operation is performed, for example, on a line or word basis.

The memory device 300 may include a plurality of memory blocks 310 to 330. Each of the memory blocks 310 to 330 may include a plurality of lines, i.e., a first line to an Nth line. As described above, because the write operation is performed on a line basis, the memory device 300 may perform a wear-leveling operation on a line basis or on a basis of a memory block including the first to Nth lines.

The memory controller 200 may include a wear-leveling module 220. As shown in FIG. 1, the wear-leveling module 220 may include a counting unit 221, and first and second wear-leveling units 222 and 223. When a request of a write operation is received from the host, the counting unit 221 may count the number of write operations on each of the memory blocks 310 to 330 of the memory device 300. Based on the number of write operations counted by the counting unit 221, the first and second wear-leveling units 222 and 223 may respectively perform static and dynamic wear-leveling operations.

The static wear-leveling operation may shift memory regions on a regular cycle regardless of the degree of wear of each memory region. The dynamic wear-leveling operation may compare the degrees of wear of the various memory regions and may swap a hot region with a cold region. As described above, the memory device 300 performs a write operation on a line basis. However, for checking the degrees of wear due to the write operation on a line basis, the frequency of write operations would have to be measured on a line basis, that is, the number of write operations should be counted for each line. This may cause a significant amount of overhead in operation of the memory system 100.

In an embodiment, the counting unit 221 may count the number of write operations on a memory block basis. The second wear-leveling unit 223 may perform the dynamic wear-leveling operation between the memory blocks 310 to 330 by swapping a memory block having a large count number with a memory block having a small count number. In addition, the first wear-leveling unit 222 may perform a static wear-leveling operation by shifting the first to Nth lines of each of the memory blocks 310 to 330. Therefore, an imbalance in the degree of wear between the first to Nth lines in a memory block may be substantially compensated for.

The memory controller 200 may further include an address mapping unit 210. The address mapping unit 210 may convert a logical address of data transmitted from the host into a physical address corresponding to a physical region of the memory device 300. The address mapping unit 210 may store a corresponding relationship between the logical address and the physical address in a mapping table included therein, and update the corresponding relationship stored in the mapping table according to a subsequent operation.

Particularly, when the wear-leveling module 220 shifts or swaps memory regions, data stored in the memory regions are moved. For example, each of data that have been respectively stored in the first to Nth lines may be moved to a subsequent line. Alternatively, data stored in a hot memory block and a cold memory block among the memory blocks 310 to 330 are exchanged with each other. Consequently, the relationship between logical addresses of data and physical addresses of memory regions in which the data are stored may be changed. The address mapping unit 210 may update the changed relationship to the mapping table. Such a mapping operation between the logical and physical addresses by the address mapping unit 210 is a well-known technique and therefore detailed description thereof is hereby omitted.

Figure 2:
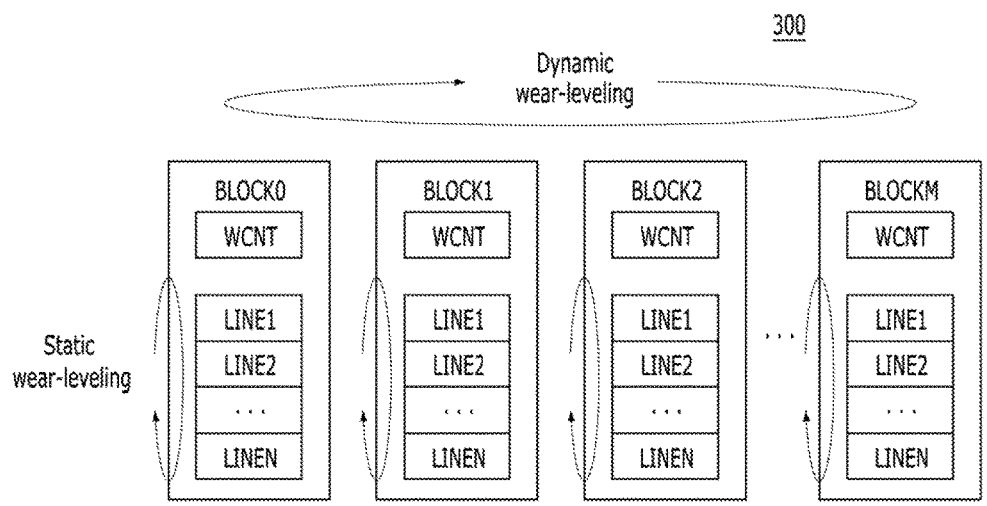
FIG. 2 is a diagram illustrating a wear-leveling operation performed in a memory device of FIG. 1, in accordance with an embodiment of the present invention.

FIG. 2 is a diagram illustrating a wear-leveling operation performed in the memory device 300 of FIG. 1, in accordance with an embodiment of the present invention.

Referring to FIG. 2, there is illustrated as an example a memory device 300 including M memory blocks BLOCK0 to BLOCKM, each of the memory blocks BLOCK0 to BLOCKM including N lines LINE1 to LINEN. In FIG. 2, reference numeral "WCNT" denotes the number of write operations, also referred to hereinafter as the write count.

The counting unit 221 may count a write count WCNT for each of the memory blocks BLOCK0 to BLOCKM, and manage the write count WCNT for each of the memory blocks BLOCK0 to BLOCKM. The second wear-leveling unit 223 may perform a dynamic wear-leveling operation of detecting a hot memory block having the largest write count WCNT and a cold memory block having the lowest write count WCNT among the memory blocks BLOCK0 to BLOCKM, and swapping the hot memory block with the cold memory block. In addition, the first wear-leveling unit 222 may perform a static wear-leveling operation of shifting the first to Nth lines LINE1 to LINEN of each of the memory blocks BLOCK0 to BLOCKM in a regular cycle. For example, the first wear-leveling unit 222 may perform a start-gap wear leveling operation of setting and shifting a gap line on which a write operation is not performed, among the first to Nth lines LINE1 to LINEN, in a regular cycle.

The wear-leveling operation illustrated in FIG. 2 may mitigate imbalance in the degree of wear between the lines of a memory block on which write operations are performed while reducing overhead of the memory system.

Another embodiment of the present invention provides an effective method for substantially reducing the number of write operations on corresponding lines when write operations are excessively focused on a certain line or a comparatively large number of write operations are performed on adjacent lines. The method includes performing a dynamic wear-leveling operation on a line basis for performing a write operation.

Figure 3:
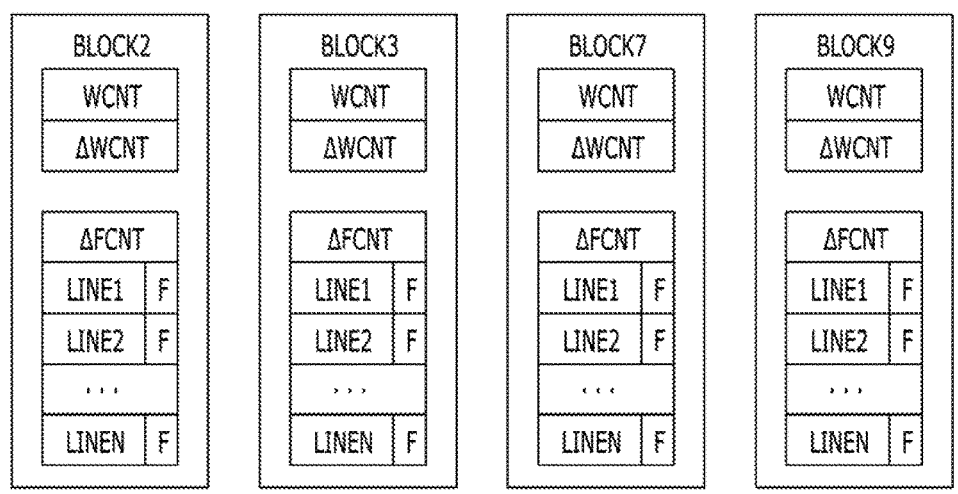
FIG. 3 is a diagram illustrating a wear-leveling operation performed in the memory device of FIG. 1, in accordance with another embodiment of the present invention.

As shown in FIG. 3, the memory device 300 may include M memory blocks (not shown). In accordance with an embodiment, some of the M memory blocks may be selected and additionally monitored. This embodiment may reduce a burden of the memory system 100 due to an additional monitoring operation. Referring to FIG. 3, there is illustrated as an example that four memory blocks BLOCK2, BLOCK3, BLOCK7, and BLOCK9 are selected from the M memory blocks. However, the present disclosure is not limited to this. Taking into account the overhead due to the additional monitoring operation, the number of selected memory blocks may be adjusted accordingly.

Memory blocks to be selected for additional monitoring may be updated on a regular cycle. The additional monitoring operation may be provided to separately manage memory blocks having relatively large imbalance in the degree of wear, and may count write operations on a regular cycle and replace the memory blocks. Accordingly, the counting unit 221 may check not only a first count WCNT obtained by counting the number of all write operations of the memory blocks, but also a second count $\Delta$WCNT obtained by counting the number of write operations in a regular cycle. Based on the second count $\Delta$WCNT, memory blocks having values that are within a preset upper range among the plurality of memory blocks may be selected. Each time a regular period passes, the second wear-leveling unit 223 may check the second count $\Delta$WCNT of the memory blocks, select a newly-added memory block and replace it with an existing memory block according to a check result.

The selected memory blocks may be monitored by the second wear-leveling unit 223. In order to perform a dynamic wear-leveling operation on the lines of the selected memory blocks, the second wear-leveling unit 223 may check write operations performed on the lines. Referring to FIG. 3, the second wear-leveling unit 223 may generate flag data F to check write operations on lines LINE1 to LINEN included in the selected memory blocks BLOCK2, BLOCK3, BLOCK7, and BLOCK9.

In accordance with a first embodiment, the flag data F generated by the second wear-leveling unit 223 may include 1-bit data. The second wear-leveling unit 223 may generate the flag data F by checking whether write operations on each of the plurality of lines LINE1 to LINEN have been performed or not. For example, in the case where a write operation has been performed on each of the lines LINE1 to LINEN, the corresponding flag data F may transit to a high level '1'. In the case where a write operation has not been performed on each of the lines LINE1 to LINEN, the corresponding flag data F may become a low level '0'. The second wear-leveling unit 223 may count the number of the flag data F of the high level on a regular cycle, and thus check a third count $\Delta$FCNT.

The second wear-leveling unit 223 may perform a dynamic wear-leveling operation on the lines LINE1 to LINEN of the selected memory blocks BLOCK2, BLOCK3, BLOCK7, and BLOCK9 on a regular cycle based on the second count $\Delta$WCNT and the third count $\Delta$FCNT. For this, the second wear-leveling unit 223 may compare the second count $\Delta$WCNT with a first threshold value V1, and compare the third count $\Delta$FCNT with a second threshold value V2. Here, the first threshold value V1 may be set based on write endurance of the memory device 300, i.e., based on a maximum count of the write operations allowed to be performed on the plurality of lines LINE1 to LINEN. That is, based on the write count which influences data stored in the memory device 300, the first threshold value V1 may be set to a value which is lower than the write count at a predetermined proportion. Furthermore, the second threshold value V2 may be set based on the number of lines LINE1 to LINEN.

The second wear-leveling unit 223 may perform a comparison operation on a regular cycle. If the second count $\Delta$WCNT is greater than or equal to the first threshold value V1 and the third count $\Delta$FCNT is less than or equal to the second threshold value V2, the second wear-leveling unit 223 may detect a line on which a write operation has been performed, that is, a line of which the corresponding flag data F has transited to a high level, as a hot line. The second count $\Delta$WCNT may be greater than or equal to the first threshold value V1 when the number of write operations performed on the corresponding memory block is greater than a reference value. The third count $\Delta$FCNT may be less than or equal to the second threshold value V2 when the write operations performed on the corresponding memory block greater than the reference value are focused on a certain line.

Therefore, the second wear-leveling unit 223 may detect such a certain line as a hot line. The first wear-leveling unit 222 may additionally shift the detected hot line. Alternatively, the second wear-leveling unit 223 may perform a dynamic wear-leveling operation by swapping the detected hot line with a cold line. In this regard, a line of which the corresponding flag data F is a low level, or a new empty line in which no data is stored, may be selected as the cold line.

The wear-leveling operation in accordance with the first embodiment using 1-bit flag data F may check whether a write operation is performed on each line, thus effectively keeping a balance in write count between lines each of which is the unit for the write operation. However, since it is checked whether the write operation has been performed, it is impossible to check how many times write operations have been performed on the corresponding line. Therefore, even when a deviation in write count between lines on which write operations have been performed is comparatively large, it may be difficult to check the deviation.

In a wear-leveling operation in according to a second embodiment, the number of write operations performed on a plurality of lines of selected memory blocks may be checked when the selected memory blocks are monitored. Referring to FIG. 3, the second wear-leveling unit 223 may check the number of write operations on a plurality of lines LINE1 to LINEN and generate flag data F. Here, the flag data F generated by the second wear-leveling unit 223 may include 2-bit data and be defined as shown in Table 1.

TABLE 1

| Data | Definition |
| --- | --- |
| 00 | Bottom group (minimum) |
| 01 | First middle group (bottom group + 1) |
| 10 | Second midde group (first middle group + 1) |
| 11 | Top group (>second middle group) |

That is, the second wear-leveling unit 223 may check the number of write operations performed on each of the plurality of lines LINE1 to LINEN using 2-bit flag data F, and group the plurality of lines LINE1 to LINEN according to their number of write operations. The plurality of lines LINE1 to LINEN may be divided into four groups as shown in Table 1. The four groups may include a bottom group in which the number of write operations having been performed is a minimum number (e.g., 0), a first middle group in which the number of write operations having been performed is greater by one than the minimum number, a second middle group in which the number of write operations having been performed is greater by one than that of the first middle group, and a top group in which the number of write operations having been performed is greater than that of the second middle group. The four groups are respectively represented as first to fourth data 00, 01, 10, and 11 based on 2-bit flag data F.

Furthermore, because the second wear-leveling unit 223 divides the plurality of lines LINE1 to LINEN into a limited number of groups, that is, four groups, there is the need of regrouping the plurality of lines LINE1 to LINEN as write operations are continuously performed. For example, as the write operations are continuously performed, all of the lines that have been included in the bottom group may be moved to the middle or top group. In this case, there is the need of regrouping lines included in the middle or top group. This regrouping operation will be described in detail with reference to FIGS. 4A and 4B.

Figure 4B:
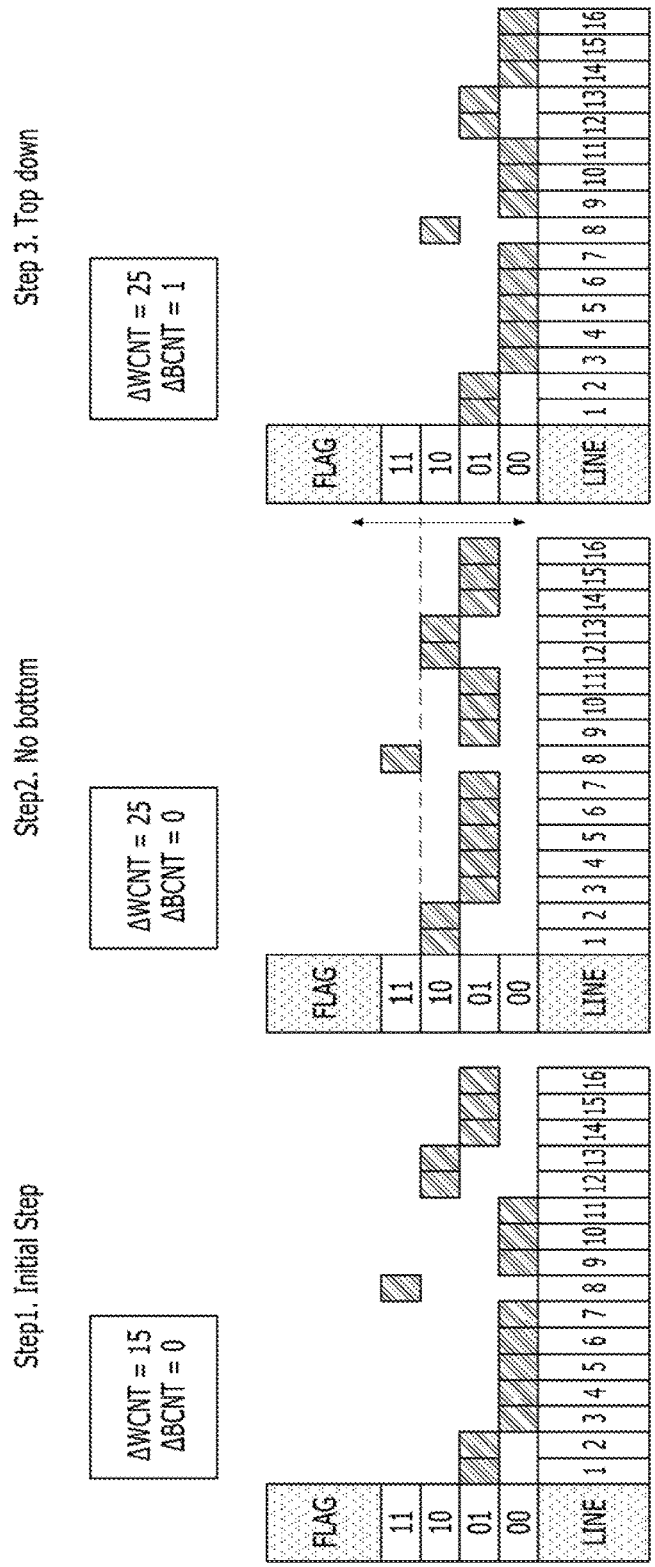

FIGS. 4A and 4B are diagrams illustrating an operation of regrouping a plurality of lines for the wear-leveling operation of FIG. 3. FIGS. 4A and 4B illustrate as an example a single memory block including sixteen lines LINE, and show changes in flag data FLAG of the lines LINE as a write operation is performed.

Referring to FIGS. 4A and 4B, at Step 1, third to seventh lines and ninth to eleventh lines are defined as the bottom group. This step is an initial step before a large number of write operations are performed. Lines on each of which a write operation has not been performed may be included in the bottom group. The second wear-leveling unit 223 may generate flag data FLAG having first data 00, for the third to seven lines and ninth to eleventh lines which are allocated in the bottom group. Furthermore, the second wear-leveling unit 223 may generate and store a fourth count ΔBCNT representing the number of write operations performed on the bottom group. It may be checked that the second count ΔWCNT representing the write count of the corresponding memory block has also a small value '15'.

As write operations are continuously performed, the flag data FLAG of the plurality of lines LINE may be changed by the second wear-leveling unit 223. Referring to Step 2 of FIGS. 4A and 4B, the flag data FLAG corresponding to the first to seventh lines and the ninth to eleventh lines have changed compared to Step 1. That is, the flag data FLAG corresponding to the first and second lines have changed from second data 01 to third data 10. This represents that write operations have been respectively performed once more on the first and second lines, so that the first and second lines that belonged to the first middle group are classified as the second middle group. Furthermore, write operations are respectively performed once more on the third to seventh lines and the ninth to eleventh lines, so that all of them that belonged to the bottom group are now classified as belonging to the first middle group.

Therefore, it may be checked that all of the third to seventh lines and the ninth to eleventh lines that had been included in the bottom group are moved to the first middle group, and all of the lines LINE belong to the middle and top groups except for the bottom group. Eventually, the lines that were included in the middle or top groups may be reclassified. A method for reclassifying the lines may depend on the write count of the corresponding memory block, that is, the second count ΔWCNT.

Referring to FIG. 4A, compared to changes in the flag data FLAG of the first to seventh lines and the ninth to eleventh lines depending on write operations, the second count ΔWCNT has greatly increased to a value '34' from a value '15'. That is, the second count ΔWCNT has greatly increased due to the write operations focused on the eighth line in the top group. For example, 9 write operations have been performed on the eighth line in the top group while 10 write operations have been respectively performed on the first to seventh lines and the ninth to eleventh lines. Accordingly, the gap in the write counts between the lines included in the top group and the second middle group is further widened. Therefore, while the lines included in the first and second middle groups are respectively reclassified as the bottom and first middle groups again, the eighth line of the top group may remain as it is. As shown in Step 3, third to seventh lines, the ninth to eleventh lines, and fourteenth to sixteenth lines that belonged to the first middle group are reclassified as the bottom group, and the first, second, twelfth and thirteenth lines that belonged to the second middle group are reclassified as the first middle group.

On the other hand, referring to FIG. 4B, the second count ΔWCNT has increased in proportion to changes in the flag data FLAG of the first to seventh lines and the ninth to eleventh lines depending on write operations. That is, it may be represented that the second count ΔWCNT is increased by the write operations that have been respectively performed once on the first to seventh lines and the ninth to eleventh lines, so that no write operation has been performed on the other lines. Therefore, the gap in the write counts between the lines included in the top group and the second middle group is not large. Accordingly, the lines included in the first and second middle groups are respectively reclassified as the bottom and first middle groups, and the lines included in the top group may be reclassified as the second middle group. As shown in Step 3, third to seventh lines, the ninth to eleventh lines, and fourteenth to sixteenth lines that belonged to the first middle group are reclassified as the bottom group, and the first, second, twelfth and thirteenth lines that belonged to the second middle group are reclassified as the first middle group. Furthermore, the eighth line that belonged to the top group is reclassified as the second middle group. Referring to FIGS. 4A and 4B, the number of write operations performed on the bottom group may be changed by the regrouping operation. Due to this, the second wear-leveling unit 223 may increase the fourth count ΔBCNT by one and store it.

According to the definition illustrated in Table 1, the write counts ΔBCNT+1 and ΔBCNT+2 of the first and second middle groups may be checked using the fourth count ΔBCNT that represents the write count of the bottom group. In addition, the second wear-leveling unit 223 may calculate the write count (ΔWCNT−(the number of lines*write count)) of the top group using the number of lines and a write count of each group from the second count ΔWCNT representing the write count of the corresponding memory block. Hence, the second wear-leveling unit 223 may calculate the write count of the top group, taking into account the second and fourth counts ΔWCNT and ΔBCNT and the number of lines of the respective groups, and then detect each line in the top group as a hot line depending on the calculated write count.

Figure 5:
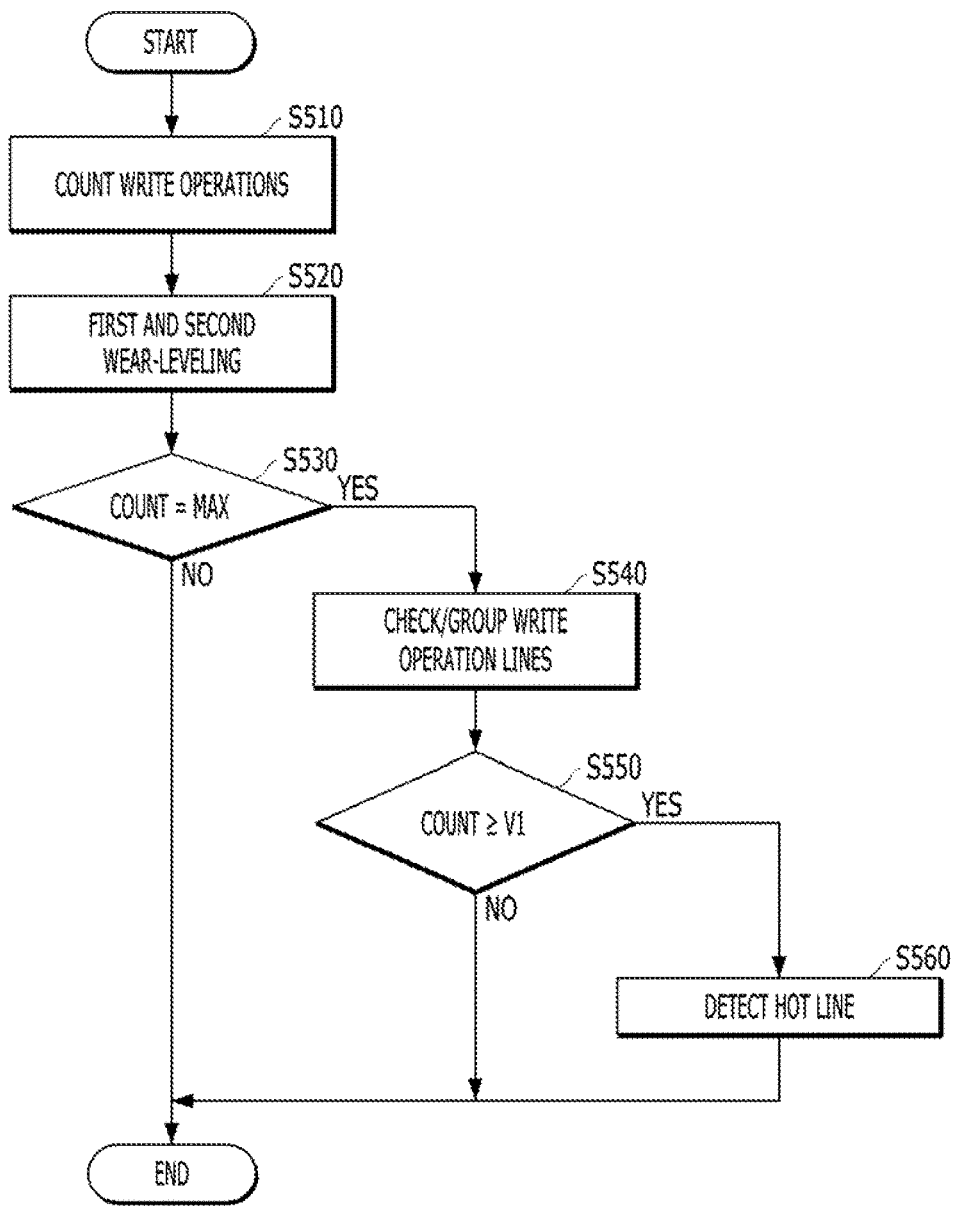
FIG. 5 is a flowchart illustrating an operation of the memory system of FIG. 1, in accordance with an embodiment of the present invention.

FIG. 5 is a flowchart illustrating an operation of the memory system of FIG. 1, in accordance with an embodiment of the present invention.

1) Count Write Operations (S510)

The counting unit 221 (refer to FIG. 1) may count the number of write operations performed in the memory device 300 (refer to FIG. 1). The counting unit 221 may count not only an entire write count (i.e., a first count WCNT) of the memory blocks 310 to 330 (refer to FIG. 1) included in the memory device 300, but also a write count (i.e., a second count ΔWCNT) in a regular cycle on a basis of each of the memory blocks 310 to 330.

2) First and Second Wear-Leveling (S520)

The first and second wear-leveling units 222 and 223 (refer to FIG. 1) may perform first and second wear-leveling operations on the plurality of memory blocks 310 to 330 of the memory device 300 based on the write count counted by the counting unit 221. That is, the first wear-leveling unit 222 may perform a static wear-leveling operation by shifting the lines LINE1 to LINEN (refer to FIG. 2) included in each of the memory blocks 310 to 330. The second wear-leveling unit 223 may perform a dynamic wear leveling operation by detecting a hot memory block and a cold memory block among the plurality of memory blocks 310 to 330 based on the write count counted by the counting unit 221 and swapping the hot memory block with the cold memory block.

3) Select a Monitoring Block (S530)

The second wear-leveling unit 223 may select at least one among the memory blocks 310 to 330 depending on the write count counted by the counting unit 221. Here, the second wear-leveling unit 223 may check the write counts of the memory blocks 310 to 330 on a regular cycle, and select a predetermined number of memory blocks whose write counts are within a preset upper range (MAX). Alternatively, the second wear-leveling unit 223 may check write counts of first memory blocks except for previously-selected memory blocks among the memory blocks 310 to 330, on a regular cycle. The second wear leveling unit 223 may select a second memory block whose write count is greater than or equal to a reference value, among the first memory blocks, as a check result, and then select a predetermined number of memory blocks, the write counts of which are the preset upper range (MAX), among the second memory block and the previously-selected memory blocks.

4) Check/Group Write Operation Lines (S540)

In accordance with the first embodiment, the second wear-leveling unit 223 may check whether write operations have been performed on the plurality of lines LINE1 to LINEN included in the memory block selected at step S530. For this, 1-bit flag data may be assigned to each of the plurality of lines LINE1 to LINEN. The second wear-leveling unit 223 may change flag data of a line on which a write operation is performed, among the plurality of lines LINE1 to LINEN, and check whether the write operations have been performed on the plurality of lines LINE1 to LINEN, by counting the number (i.e., a third count ΔFCNT) of lines the flag data of which have transited to a high level.

In accordance with the second embodiment, the second wear-leveling unit 223 may check the number of write operations performed on the plurality of lines LINE1 to LINEN using 2-bit flag data, and group the plurality of lines LINE1 to LINEN according to the number of the write operations performed on each of the lines LINE1 to LINEN included in the selected memory block. Here, the 2-bit flag data may be assigned to each of the lines LINE1 to LINEN. The second wear-leveling unit 223 may classify the plurality of lines LINE1 to LINEN into the bottom group, the first middle group, the second middle group, and the top group, using first to fourth data 00, 01, 10, and 11 of the 2-bit flag data, and separately store the number of the write operations performed on the bottom group, as a fourth count ΔBCNT.

Furthermore, as write operations are continuously performed, the second wear-leveling unit 223 may regroup the plurality of lines LINE1 to LINEN. In the case where all lines of the bottom group are reclassified into the first middle group, the second middle group, or the top group, and there is no longer a line in the bottom group, the second wear-leveling unit 223 may reclassify the lines of the first and second middle groups into the bottom group and the first middle group, respectively. The second wear-leveling unit 223 may respectively change the flag data of the lines of the first and second middle groups from second and third data 01 and 10 to first and second data 00 and 01. Here, the second wear-leveling unit 223 may increase and store a count representing the number of the write operations on the bottom group, by one. If the write count of the selected memory block is less than the reference value, the lines of the top group may also be reclassified as the second middle group.

5) Compare a Count and Detect a Hot Line (S550 and S560)

The second wear-leveling unit 223 may check the write count of the selected memory block at step S550. If the write count is greater than or equal to a first threshold value V1 (YES at step 550), the second wear-leveling unit 223 may detect a hot line for the plurality of lines LINE1 to LINEN included in the selected memory block, at step S560.

In accordance with the first embodiment, the counted number of lines whose flag data has been transited to a high level, at step S540, may be compared with a second threshold value V2. When the counted number of lines is less than or equal to the second threshold value V2, a line corresponding to the flag data of a high level may be detected as a hot line. The first wear-leveling unit 222 may additionally shift the detected hot line, or the second wear-leveling unit 223 may select a line whose flag data has not been changed, as a cold line, and swap the detected hot line with the selected cold line.

In accordance with the second embodiment, the top group may be detected as a hot line depending both on the number of lines of the bottom group, the first middle group, the second middle group, and the top group which are classified at step S540, and on the number of the write operations performed on the bottom group. The second wear-leveling unit 223 may check the number of write operations performed on the first and second middle groups based on the number of the write operations performed on the bottom group. Furthermore, the number of write operations performed on the top group may be calculated from the write count of the selected memory block using the stored number of write operations and the number of lines of each group. Therefore, the second wear-leveling unit 223 may detect a line of the top group as a hot line depending on a calculating result. If the line of the top group is detected as a hot line, the first wear-leveling unit 222 may additionally shift the detected hot line, or the second wear-leveling unit 223 may swap the detected hot line with a line of the bottom group.

In accordance with various embodiments, it may be separately checked whether a write operation on a basic region on which the write operation is performed in a memory device, e.g., on each line, has been performed. Therefore, a region where a comparatively large number of write operations have been performed may be easily detected, whereby a wear-leveling operation may be effectively performed. To achieve this, write operations are counted on a basis of a memory block including a plurality of lines, and lines to be monitored are selected. For the selected lines, it is checked only whether a write operation has been performed, in lieu of counting the number of write operations, whereby overhead in operating the memory system may be reduced.

Moreover, lines on which write operations have been performed are classified into several groups using minimum information, so that a deviation in write count between the lines on which the write operations have been performed is prevented from being excessively increased, and an error which may occur when a hot line is detected may be reduced.

Although various embodiments have been described for illustrative purposes, it will be apparent to those skilled in the art that various changes and modifications may be made without departing from the spirit and scope of the disclosure as defined in the following claims.

What is claimed is:

1. A memory system comprising:
    a memory device configured to perform write operations on one or more lines included in a memory block among a plurality of memory blocks included in the memory device;
    a counting unit configured to count a write count for each of the plurality of memory blocks, and output the write counts;
    a first wear-leveling unit configured to perform a wear leveling operation by shifting the one or more lines of each of the plurality of memory blocks; and
    a second wear-leveling unit configured to detect hot and cold memory blocks among the plurality of memory blocks based on the write counts, and swap the hot memory block with the cold memory block,
    wherein the second wear-leveling unit selects at least one memory block among the plurality of memory blocks based on the write counts, and checks whether the write operation is performed on each of the one or more lines included in the selected memory block.

2. The memory system of claim 1, wherein, on a regular cycle, when the write count of the selected memory block is greater than or equal to a first reference value, and the number of first lines on which the write operation are performed is less than or equal to a second reference value, the second wear-leveling unit detects the first lines as a hot line.

3. The memory system of claim 1, wherein the second wear-leveling unit generates flag data to check the write operations on the one or more lines and wherein the memory device is a variable resistance memory device.

4. An operating method for a memory system, comprising:
    counting the number of write operations for a plurality of memory blocks of a memory device, and output write counts;
    performing a first wear-leveling operation by shifting a plurality of lines included in each of the plurality of memory blocks;
    performing a second wear-leveling operation by detecting hot and cold memory blocks among the plurality of memory blocks based on the write counts, and swapping the hot memory block with the cold memory block;
    selecting at least one of the plurality of memory blocks based on the write counts, and detecting a hot line by checking whether the write operation is performed on each of the plurality of lines included in the selected memory block.

5. The operating method of claim 4, wherein, on a regular cycle, when the write count of the selected memory block is greater than or equal to a first reference value, and the number of first lines on which the write operation is performed is less than or equal to a second reference value, the first lines are detected as the hot line.

6. The operating method of claim 5, further comprising performing the first wear-leveling operation by shifting the detected hot line.

7. The operating method of claim 5, further comprising:
    selecting a second line on which the write operation is not performed, among the plurality of lines, as a cold line; and
    swapping the detected hot line with the selected cold line.

8. The operating method of claim 5, further comprising:
    generating flag data of 1-bit assigned to each of the plurality of lines included in the selected memory block.

9. The operating method of claim 8, wherein the detecting of the hot line by checking whether the write operation is performed on the plurality of lines comprises:
    changing the flag data of a line on which the write operation is performed, among the plurality of lines, from a low level to a high level;
    counting the number of flag data changed to the high level; and comparing the counted number of flag data with the second reference value when the write count of the selected memory block is greater than or equal to the first reference value.

10. The operating method of claim 4, wherein the selecting of at least one of the plurality of memory blocks comprises:
checking the write counts of the plurality of memory blocks on a regular cycle; and
selecting a predetermined number of memory blocks whose write counts are within a preset upper range, as a check result.

11. The operating method of claim 4, wherein the selecting of at least one of the plurality of memory blocks comprises:
checking write counts of first memory blocks except for previously-selected memory blocks among the plurality of memory blocks, on a regular cycle;
selecting a second memory block whose write count is greater than or equal to a third reference value, among the first memory blocks, as a check result; and
selecting a predetermined number of memory blocks whose write counts are within a preset upper range, among the second memory block and the previously-selected memory blocks.

12. The operating method of claim 5, wherein the write operation is performed on a basis of the plurality of lines.

13. The operating method of claim 12, wherein the first reference value is set based on a maximum count of the write operations allowed to be performed on the plurality of lines, and the second reference value is set based on the number of the lines.

14. An operating method for a memory system, comprising:
counting the number of write operations for a plurality of memory blocks of a variable resistance memory device, and output the write counts;
performing a first wear-leveling operation by shifting a plurality of lines included in each of the plurality of memory blocks;
performing a second wear-leveling operation by detecting hot and cold memory blocks among the plurality of memory blocks based on the write counts, and swapping the hot memory block with the cold memory blocks;
selecting at least one of the plurality of memory blocks based on the write counts, and grouping the plurality of lines included in the selected memory block into a top group, a middle group and a bottom group depending on the number of write operations performed on the plurality of lines; and
detecting, on a regular cycle, a line of the top group as a hot line depending on the number of the grouped lines and the number of the write operations performed on the bottom group, when the write count of the selected memory block is greater than or equal to a first reference value.

15. The operating method of claim 14, further comprising:
generating flag data of 2-bit assigned to each of the plurality of lines included in the selected memory block.

16. The operating method of claim 15, wherein the grouping of the plurality of lines comprises:
classifying the plurality of lines into the bottom group, a first middle group, a second middle group, and the top group using first to fourth data of the 2-bit flag data; and
storing the number of write operations performed on the bottom group.

17. The operating method of claim 16, wherein the classifying of the plurality of lines into the bottom group, the first middle group, the second middle group, and the top group comprises:
classifying, as the bottom group, a line on which the write operation is not performed among the plurality of lines;
classifying, as the first middle group, a line on which the write operation is performed once among lines of the bottom group;
classifying, as the second middle group, a line on which the write operation is performed once more among lines of the first middle group; and
classifying, as the top group, a line on which the write operation is performed at least once more among lines of the second middle group.

18. The operating method of claim 17, wherein, when all of the lines of the bottom group are classified into the first middle group, the second middle group, or the top group, the grouping of the plurality of lines further comprises:
reclassifying the lines of the first and second middle groups into the bottom and the first middle group, respectively; and
increasing the number of the write operations performed on the bottom group by one.

19. The operating method of claim 18, wherein the reclassifying of the lines of the first and second middle groups comprises
reclassifying the lines of the top group as the second middle group when the write count of the selected memory block is less than or equal to a second reference value.

20. The operating method of claim 16, wherein the detecting of the line of the top group as the hot line comprises:
calculating the number of write operations performed on the top group from the write count, using the number of the grouped lines, and the stored number of the write operations; and
detecting the line of the top group as the hot line depending on a calculating result.

* * * * *